(12) United States Patent
Chen et al.

(10) Patent No.: US 11,981,985 B2
(45) Date of Patent: May 14, 2024

(54) METHOD FOR MANUFACTURING SPECIAL VEHICLE WHEELS WITH 7000 SERIES ALUMINUM ALLOY

(71) Applicant: CITIC Dicastal Co., Ltd., Qinhuangdao (CN)

(72) Inventors: Tieqiang Chen, Qinhuangdao (CN); Zuo Xu, Qinhuangdao (CN); Zhihua Zhu, Qinhuangdao (CN); Qingzhu Zhang, Qinhuangdao (CN); Lixin Huang, Qinhuangdao (CN); Meng Li, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 113 days.

(21) Appl. No.: 17/576,201

(22) Filed: Jan. 14, 2022

(65) Prior Publication Data

US 2022/0307118 A1    Sep. 29, 2022

(30) Foreign Application Priority Data

Mar. 29, 2021 (CN) .......................... 202110331345.5

(51) Int. Cl.
*C22F 1/047* (2006.01)
*B21D 53/26* (2006.01)
*C22C 21/08* (2006.01)

(52) U.S. Cl.
CPC ............ *C22F 1/047* (2013.01); *B21D 53/264* (2013.01); *C22C 21/08* (2013.01)

(58) Field of Classification Search
CPC .......... C22F 1/047; C22F 1/04; B21D 53/264; B21D 53/30; C22C 21/08; C22C 1/026; B21J 9/025; B21J 5/002; B21J 5/12; B21J 13/12; B21K 1/34; B21K 1/38; B21K 7/12; B21K 1/28; B23P 15/00; C21D 1/18;
(Continued)

(56) References Cited

FOREIGN PATENT DOCUMENTS

CN       103481029 A  *  1/2014  ............. B21D 22/16
CN       102601587 B  *  4/2014  ............. B21J 9/025
(Continued)

OTHER PUBLICATIONS

CN-111304503-A, machine translation. (Year: 2020).*
(Continued)

*Primary Examiner* — John A Hevey
(74) *Attorney, Agent, or Firm* — IPro, PLLC

(57) ABSTRACT

The disclosure discloses a method for manufacturing special purpose vehicle wheels by using 7000 series aluminum alloys, comprising the following steps: step 1, smelting 7000 series aluminum alloys in a smelting furnace; step 2, making the solution obtained in step 1 into an aluminum alloy ingot blank through a spraying and forming process; step 3, extruding the aluminum alloy ingot blank of step 2 to obtain an extrusion bar; step 4, sawing the extrusion bar into blanks and heating them; step 5, rolling the blank into a cake; step 6, putting the cake into a press for forging and forming; step 7, spinning and forming the wheel rim. The wheel manufactured by the method for manufacturing special vehicle wheels with 7000 series aluminum alloys in the present disclosure has high and stable conductivity, qualified impact test and good bending and radial fatigue performance.

2 Claims, 2 Drawing Sheets

(58) Field of Classification Search
CPC .......... C21D 9/34; B22D 23/003; B21B 1/02; B21C 23/08
See application file for complete search history.

(56) References Cited

FOREIGN PATENT DOCUMENTS

| CN | 104015011 A | * | 9/2014 | .............. B23P 15/00 |
| CN | 107475618 A | * | 12/2017 | .............. C21D 1/18 |
| CN | 111304503 A | * | 6/2020 | |

OTHER PUBLICATIONS

CN-103481029-A. machine translation. (Year: 2014).*
CN-102601587-B, machine translation. (Year: 2014).*
CN-107475618-A, Huang, machine translation. (Year: 2017).*
CN-104015011-A, Zhu, machine translation. (Year: 2014).*

* cited by examiner

METHOD FOR MANUFACTURING SPECIAL VEHICLE WHEELS WITH 7000 SERIES ALUMINUM ALLOY

TECHNICAL FIELD

The disclosure herein relates to the technical field of vehicle wheels in vehicles, in particular to a method for manufacturing special vehicle wheels by applying 7000 series aluminum alloys.

BACKGROUND

Compared with cast wheels, forged wheels can refine grain, break nonmetallic inclusions and distribute them along the deformation direction, improve or eliminate composition segregation, etc., so as to optimize the internal structure of materials, make their structures compact and improve their comprehensive mechanical properties. Special purpose vehicle mainly refers to vehicles equipped with special apparatus and special functions, which are used to undertake special transportation tasks or special operations and other special purposes, such as fire engines and large oil tankers. Aluminum alloy wheels for special purpose vehicles have higher requirements on the quality, safety and durability than passenger car wheels due to their special use environment, high load capacity and large impact. Therefore, forging technology is generally used to manufacture aluminum alloy wheels for special vehicles. At present, the raw materials of forged aluminum alloy wheels mainly use aluminum alloy grades such as 6061 and 6082, and their tensile strength is about 300-400 MPa, so there is limited room for strength improvement. With the development of automobile lightweight, forged aluminum alloy wheels for special purpose vehicles need to be further reduced. It is very difficult to further reduce the weight of 6000 series aluminum alloy grade based on the existing technology, so it is imperative to develop 7000 series high-strength aluminum alloy forged wheels.

Compared with 6000 series alloys, the 7000 series high-strength aluminum alloy is Al—Mg—Zn—Cu alloy. The alloy containing zinc has poor forging formability and it is difficult to accurately control metal flow, which seriously restricts the application in wheels of special vehicles. Meanwhile, the complex composition of 7000 series high-strength aluminum alloy, serious composition segregation in traditional casting process and uneven distribution of various precipitated phase and the like have an important impact on the subsequent use of wheels. How to accurately control the microstructure is also a great challenge.

Spraying and forming is a new generation of rapid solidification technology of alloys. Combined with the existing material calculation and high-efficiency melt composite purification technology, high-quality and large-diameter 7000 series high-strength aluminum alloy cast bars with uniform composition and structure, fine grain size and no obvious defects can be obtained. On the premise that raw materials are guaranteed, the plastic forming characteristics of high-strength aluminum alloy are deeply grasped, and the forging forming and microstructure of forged aluminum alloy wheels for special purpose vehicles are accurately controlled through finite element simulation and process optimization. Based on this, it is necessary to systematically develop the manufacturing process of forged aluminum alloy wheels for special purpose vehicles in the current manufacturing process of forged aluminum alloy wheels.

SUMMARY

In view of this, the present disclosure aims to provide a method for manufacturing special purpose vehicle wheels by using 7000 series aluminum alloys, which can obtain wheels with high strength and high fatigue performance and meet the requirements of further weight reduction.

In order to achieve the above purpose, the technical solution of the present disclosure is realized as follows:

A method for manufacturing special vehicle wheels by using 7000 series aluminum alloys comprises the following steps:

Step 1, smelting 7000 series aluminum alloys in a smelting furnace;

Step 2, making the solution obtained in step 1 into an aluminum alloy ingot blank through a spraying and forming process;

Step 3, extruding the aluminum alloy ingot blank of step 2 to obtain an extrusion bar;

Step 4, sawing the extrusion bar into blanks and heating them;

Step 5, rolling the blank into a cake;

Step 6, putting the cake into a press for forging and forming;

Step 7, spinning and forming the wheel rim.

In some embodiments, step 6 includes an initial forging process and a final forging process, forming the wheel rim, spoke, window.

In some embodiments, a trimming and reaming process is also included between steps 6 and 7.

In some embodiments, spin and form the rim in step 7.

In some embodiments, step 7 is followed by solid solution, quenching and aging treatment.

In some embodiments, the blank is put into a rotary forging press and rolled into a cake in step 5.

In some embodiments, the initial forging process is performed at the initial forging press, initially forming the spokes, wheel rims, and windows, and the final forging process is performed at the final forging press, completely forming the spokes and windows.

In some embodiments, the quenching water temperature is 60-63° C., the transfer time is less than 15 s, and swing up and down more than 30 times, after quenching, stay in water for more than 30 min, and the temperature rise cannot exceed 65° C.

Compared with the ingot by adopting traditional direct chill casting under the same forging process, the method for manufacturing special purpose vehicle wheels by using 7000 series aluminum alloys of the present disclosure has the following advantages:

The wheel manufactured by the method for manufacturing special purpose vehicle wheels by using 7000 series aluminum alloys of the present disclosure has a strength of more than 500 MPa and an elongation of more than 10%, and has high strength and good toughness.

The wheel manufactured by the method for manufacturing special purpose vehicle wheels by using 7000 series aluminum alloys of the present disclosure has higher and more stable electrical conductivity, is qualified in impact tests, and has good bending and radial fatigue properties.

The wheel manufactured by the method for manufacturing special purpose vehicle wheels by using 7000 series aluminum alloys of the present disclosure has low intergranular corrosion sensitivity and good corrosion resistance.

BRIEF DESCRIPTION OF FIGURES

The accompanying drawings, which form a part of the disclosure, serve to provide a further understanding of the disclosure, and the illustrative embodiments of the disclosure and the description thereof serve to explain the disclosure and are not unduly limiting. In the drawings.

DETAILED DESCRIPTION

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

A clear and complete description of the technical aspects of the present disclosure will be given below with reference to the accompanying drawings and in conjunction with embodiments. It is apparent that the described embodiments are only part of and not all of the embodiments of the present disclosure. Based on the embodiments in the present disclosure, all other embodiments obtained by those skilled in the art without making creative efforts are within the scope of protection of the present disclosure.

Figure 1:
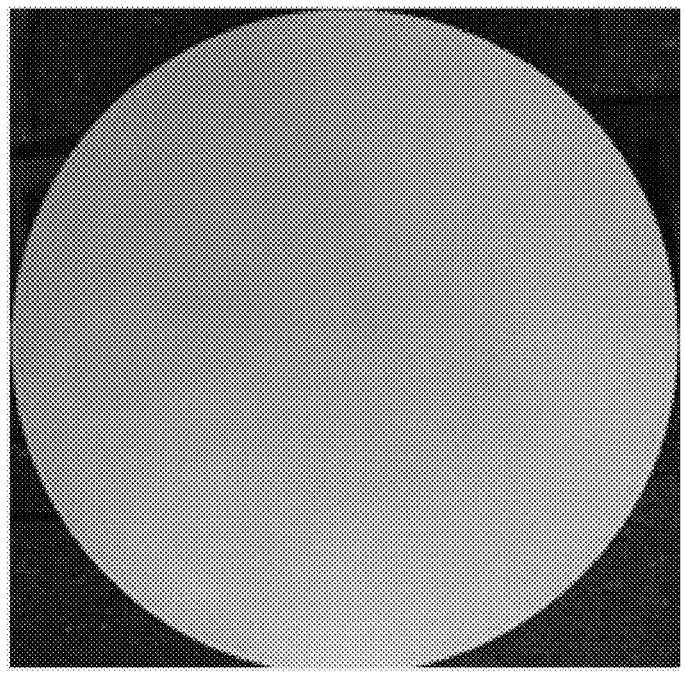
FIG. 1 is a low magnification photograph of a spray-formed ingot by the method for manufacturing special purpose vehicle wheels using 7000 series aluminum alloys according to the present disclosure.
Figure 2:
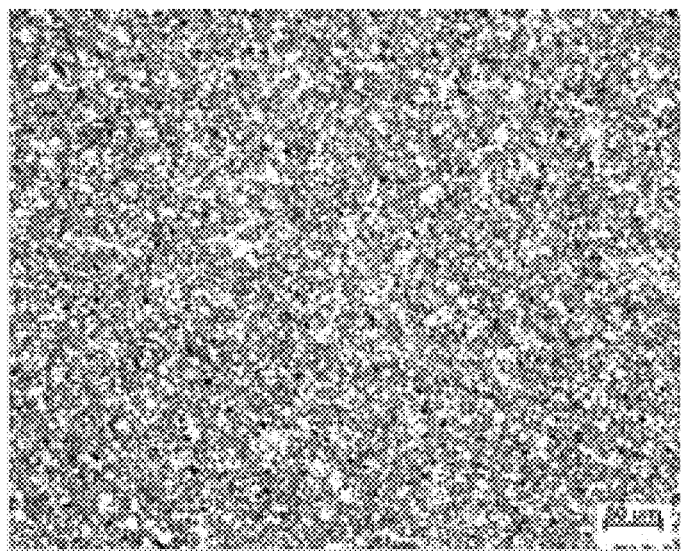
FIG. 2 is a photograph of the structure of a spray-formed ingot by the method for manufacturing special vehicle wheels by using 7000 series aluminum alloy according to the present disclosure.
Figure 3:
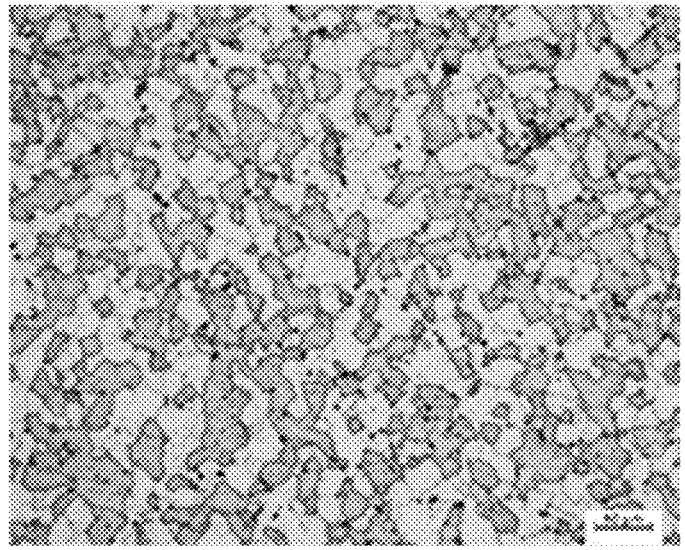
FIG. 3 is the microstructure photograph of 7000 series aluminum alloy ingot by direct chill casting.
Figure 4:
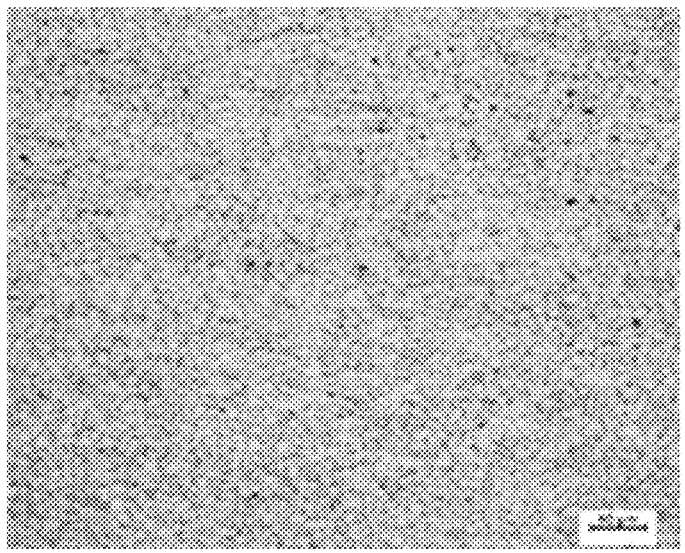
FIG. 4 is a photograph of the organization of a wheel manufactured by the method for producing special purpose vehicle wheels using 7000 series aluminum alloys according to the present disclosure.

A method for manufacturing special purpose vehicle wheels using 7000 series aluminum alloys according to embodiments of the present disclosure is described below with reference to FIGS. 1 to 4 and in conjunction with embodiments.

A method for manufacturing special vehicle wheels by using 7000 series aluminum alloys comprises the following steps:

Step 1, smelting 7000 series aluminum alloys in a smelting furnace; batching according to the chemical composition and mass percentage of the alloy, melting in a smelting furnace, and treating on-line degassing and slag removal after secondary refining.

Step 2, after standing for a certain time, the solution obtained in step 1 is transferred to a leaky package to obtain 7000 series aluminum alloy ingots by spraying and forming process, and the density of ingot is over 99%.

Step 3, extruding the aluminum alloy ingot blank of step 2 to obtain an extrusion bar with a diameter of 180-250 mm, the extrusion bar temperature of 400-450° C., the extrusion die temperature of 400-450° C., the extrusion product speed of 0.1-0.5 mm/min and the extrusion ratio of 10-20.

Step 4, sawing the obtained extruded bar into a 200-400 mm blank, heating the blank to a set temperature of 420-450° C. in a heating furnace for 400-450 min to ensure the uniform temperature of the blank.

Step 5, the blank is put into the rotary forging press by the robot, the lubricating hand robot automatically sprays graphite lubricant, the slider on the equipment drives the upper die to rotate and press down according to the program control, and the bar is rolled with a 5-degree processing angle in a rotating way to roll the bar into a cake. The working temperature of the die is 400-430° C.

Step 6, the robot takes out the rotary forging cake from the rotary forging and puts it into the initial forging press, the lubricating hand robot automatically sprays graphite lubricant, the upper slider of the initial forging press drives the upper die to press down, and the blank fills the die cavities of the upper and lower dies according to the designated tonnage, the working temperature of the die is 390-420° C., and the blank temperature after rotary forging is 420-440° C. In the process of initial forging, the spokes, windows and wheel rims of the hub are initially formed.

The robot takes out the initial forging blank from the initial forging machine and puts it into the final forging press. The lubricating hand robot automatically sprays graphite lubricant. The upper slider of the final forging press drives the upper die to press down, and fills the upper and lower die cavities with the blank according to the designated tonnage. The working temperature of the die is about 390-420° C., and the blank temperature after initial forging is 420-440° C. In the final forging process, the hub spokes and windows are all formed, and the wheel rim is initially formed.

After the final forging, the robot puts the forging blank into the trimming and reaming machine, and the trimming and reaming process completes the on-line punching and reaming of the wheel rim, and cuts off the flash at the same time. The slider on the equipment drives the upper die to press down, expands the blank rim according to the specified height, flushes out the central hole, and cuts off the flash; prepare for the subsequent spinning process; the die temperature is room temperature, and the blank temperature after trimming is 380-400° C.

Step 7, Place the forging off-line blank on the spinning die, then three rollers move according to the processing program, and through hot spinning, the forged short-thick wheel rim is spun into a thin rim, and the product is basically formed, the three-roller vertical spinning machine having room temperature of the die and 380-420° C. of the blank.

After spinning, the forged wheel blank is sent into a solid solution furnace for solid solution treatment, and then quenched. The quenching water temperature is 60-63° C., the transfer time is less than 15 s, and it swings up and down for more than 30 times. After quenching, it stays in water for more than 30min, and the temperature rise cannot exceed 65° C. Transfer to ageing furnace for aging treatment within 4 hours after quenching treatment. After ageing treatment, it is discharged and air-cooled.

Embodiment 1

In this embodiment, 7055 aluminum alloy in 7000 series aluminum alloy taken as an example to specifically explain the technical solution is batched according to the chemical composition and mass percentage of 7055 alloy shown in Table 1, melted in a smelting furnace, treated by on-line degassing and slag removal after secondary refining, and transferred to a leaky bag to obtain 7055 aluminum alloy ingot by spray forming process after standing for a certain time, and the density of ingot is over 99%. Comparative example 1 is the 7055 aluminum alloy ingot manufactured by traditional direct chill casting method.

The extrusion bar with diameter of 203 mm is obtained by extruding 7055 aluminum alloy ingot. The extrusion bar temperature is 420° C., the extrusion die temperature is 430° C., the extrusion speed is 0.3 mm/min, and the extrusion ratio is 15.

The extruded bar is sawed into a 350 mm blank, and the blank is heated to the set temperature of 430° C. in a heating furnace for 420 min to ensure the uniform temperature of the blank.

The blank is put into the rotary forging press by robot, and the die temperature is 420° C. The lubricating hand robot sprays graphite lubricant automatically, and the slider on the equipment drives the upper die to rotate and press down according to the program control, and rolls the bar with a 5-degree processing angle in a rotating way to roll the bar into a cake.

The robot takes out the rotary forging cake from the rotary forging and puts it into the initial forging press, the lubricating hand robot automatically sprays graphite lubricant, the upper slider of the initial forging press drives the upper die to press down, and fills the upper and lower die cavities with the blank according to the specified tonnage. The working temperature of the die is 410° C., and the blank temperature after rotary forging is 430° C. In the process of initial forging, the spokes, windows and wheel rims of the wheel hub are initially formed.

The robot takes out the initial forging blank from the initial forging machine and puts it into the final forging press. The lubricating hand robot automatically sprays graphite lubricant. The upper slider of the final forging press drives the upper die to press down, and fills the upper and lower die cavities with the blank according to the designated tonnage. The die temperature is 410° C., and the blank temperature after initial forging is 430° C. In the final forging process, the wheel hub spokes and windows are all formed, and the wheel rim is initially formed.

After the final forging, the robot puts the forging blank into the trimming and reaming machine, and the trimming and reaming process completes the on-line punching and reaming of the wheel rim, and cuts off the flash at the same time. The slider on the equipment drives the upper die to press down, expands the blank wheel rim according to the specified height, flushes out the central hole, and cuts off the flash; prepare for the subsequent spinning process; the die temperature is room temperature, and the blank temperature after trimming is 390° C.

The forging off-line blank is placed on the spinning die, and then three rollers move according to the processing program. Through hot spinning, the forged short-thick wheel rim is spun into a thin rim, and the product is basically formed. The three-roller vertical spinning machine, the die temperature is room temperature, and the blank temperature is 400° C.

After spinning, the forged wheel blank is sent into a solid solution furnace for solid solution treatment. The solid solution furnace rises to 460±5° C. within 3±0.5 h, kept warm for 4±0.2 h, and rises to 475±5° C. within 0.5±0.1 h, kept warm for 4±0.2 h; then in the quenching treatment, the quenching water temperature is 60° C., the transfer time is less than 15s, and it swings up and down for more than 30 times. After quenching, it stays in water for more than 30 min, and the temperature rise cannot exceed 65° C.; it is transferred to an aging furnace for aging treatment within 4 hours after quenching treatment. The aging furnace rises to 120±3° C. within 1±0.2 h, kept warm for 7±1 h, and rises to 158±3° C. within 1±0.2 h, kept warm for 18±1h. After aging treatment, it is discharged from the furnace for air cooling.

TABLE 1

7055 Alloy Composition and Weight Percentage

| No. | Si | Fe | Cu | Mn | Mg | Cr | Zn | Ti | Zr | Al |
|---|---|---|---|---|---|---|---|---|---|---|
| 1 | 0.03 | 0.05 | 2.52 | 0.001 | 2.09 | 0.006 | 8.2 | 0.03 | 0.13 | Balance |
| 2 | 0.05 | 0.08 | 2.14 | 0.005 | 1.98 | 0.003 | 8 | 0.04 | 0.11 | Balance |
| 3 | 0.02 | 0.1 | 2.4 | 0.022 | 2.12 | 0.021 | 8.1 | 0.05 | 0.16 | Balance |
| 4 | 0.04 | 0.09 | 2.35 | 0.012 | 2.21 | 0.009 | 7.8 | 0.03 | 0.14 | Balance |
| comparative example 1 | 0.03 | 0.04 | 2.38 | 0.006 | 2.15 | 0.008 | 8.1 | 0.04 | 0.15 | Balance |

The mechanical properties of 7055 forged wheels are shown in Table 2:

TABLE 2

Mechanical Properties of 7055 Forged Wheels

| No. | Part | Yield strength/ MPa | tensile strength/ MPa | elongation/% | section shrinkage/% |
|---|---|---|---|---|---|
| 1 | Wheel center | 523 | 581 | 14.3 | 35.3 |
|   | Spokes | 557 | 592 | 14.6 | 36.8 |
|   | Outer rim | 562 | 595 | 12.6 | 33.8 |
|   | Inner rim | 559 | 588 | 13.2 | 35.9 |
| 2 | Wheel center | 525 | 571 | 11.8 | 33.1 |
|   | Spokes | 555 | 591 | 12.3 | 34.5 |
|   | Outer rim | 551 | 589 | 11.3 | 34.8 |
|   | Inner rim | 585 | 617 | 10.9 | 32.6 |
| 3 | Wheel center | 528 | 575 | 12.8 | 32.6 |
|   | Spokes | 564 | 604 | 12.6 | 33.4 |
|   | Outer rim | 583 | 612 | 11.3 | 32.7 |
|   | Inner rim | 573 | 598 | 13.6 | 32.9 |

TABLE 2-continued

Mechanical Properties of 7055 Forged Wheels

| No. | Part | Yield strength/ MPa | tensile strength/ MPa | elongation/% | section shrinkage/% |
|---|---|---|---|---|---|
| 4 | Wheel center | 530 | 587 | 13.8 | 34.3 |
| | Spokes | 543 | 586 | 12.6 | 32.2 |
| | Outer rim | 540 | 592 | 12.9 | 33.6 |
| | Inner rim | 567 | 597 | 13.5 | 32.7 |
| comparative example 1 | Wheel center | 524 | 568 | 6.7 | 23.1 |
| | Spokes | 525 | 564 | 8.6 | 22.4 |
| | Outer rim | 537 | 578 | 7.2 | 19.8 |
| | Inner rim | 532 | 586 | 6.2 | 21.2 |

The electrical conductivity, impact performance and fatigue performance of 7055 forged wheels are shown in Table 3:

TABLE 3

Electrical Conductivity, Impact Performance and Fatigue Performance of Forged Wheels

| | Electrical conductivity/ | 13° Impact | | Bench experiment Bending fatigue/ | Radial fatigue/ |
|---|---|---|---|---|---|
| No. | % IACS | 0° | 90° | rotation | rotation |
| 1 | 37.8-39.2 | Qualified | Qualified | 564829 | 1736201 |
| 2 | 37.7-39.1 | Qualified | Qualified | 621728 | 1836529 |
| 3 | 38.2-39 | Qualified | Qualified | 632981 | 1682643 |
| 4 | 38-39.4 | Qualified | Qualified | 596470 | 1773927 |
| comparative example 1 | 36.2-37.5 | Unqualified | Unqualified | 367281 | 893658 |

Samples were sampled according to BS EN ISO 11846, and the corrosion depth is measured by immersing samples in 30g/L NaCl+10ml HCl solution at room temperature for 24h according to method 2. The maximum depth and average depth of intergranular corrosion of 7055 forged wheels of the present disclosure and Comparative Embodiment 1 are shown in Table 4:

TABLE 4

Corrosion Resistance of Forged Wheels

| | Maximum depth of intergranular corrosion/μm | | | | | |
|---|---|---|---|---|---|---|
| No. | 1 | 2 | 3 | 4 | 5 | Average |
| 1 | 37 | 56 | 45 | 78 | 21 | 47 |
| 2 | 46 | 76 | 47 | 46 | 56 | 54 |
| 3 | 21 | 66 | 42 | 77 | 72 | 56 |
| 4 | 26 | 54 | 71 | 85 | 35 | 54 |
| Comparative example 1 | 189 | 173 | 231 | 221 | 342 | 231 |

Embodiment 2

In this embodiment, 7034 aluminum alloy in 7000 series aluminum alloy taken as an example to specifically explain the technical solution is batched according to the chemical composition and mass percentage of 7034 alloy shown in Table 5, melted in a smelting furnace, treated by on-line degassing and slag removal after secondary refining, transferred to a leaky bag to obtain 7034 aluminum alloy ingot by spray forming process after standing for a certain time, and the density of ingot is over 99%. Comparative example 2 is the production of 7034 aluminum alloy ingot by traditional direct chill casting method.

The extrusion bar with diameter of 228 mm is obtained by extruding 7034 aluminum alloy ingot. The extrusion bar temperature is 410° C., the extrusion die temperature is 420° C., the extrusion speed is 0.15 mm/min, and the extrusion ratio is 18.

The extruded bar is sawed into a 275 mm blank, and the blank is heated to the set temperature of 420° C. in a heating furnace for 450min to ensure the uniform temperature of the blank.

The blank is put into the rotary forging press by robot, and the die temperature is 400° C. The lubricating hand robot sprays graphite lubricant automatically, the slider on the equipment drives the upper die to rotate and press down according to the program control, and rolls the bar with a 5-degree processing angle in a rotating way to roll the bar into a cake.

The robot takes out the rotary forging cake from the rotary forging and puts it into the initial forging press, and the lubricating hand robot automatically sprays graphite lubricant. The upper slider of the initial forging press drives the upper die to press down, and fills the upper and lower die cavities with the blank according to the specified tonnage. The working temperature of the die is 390° C., and the blank temperature after rotary forging is 420° C. In the process of initial forging, the spokes, windows and wheel rims of the wheel hub are initially formed.

The robot takes out the initial forging blank from the initial forging machine and puts it into the final forging press. The lubricating hand robot automatically sprays graphite lubricant. The upper slider of the final forging press drives the upper die to press down, and fills the upper and lower die cavities with the blank according to the designated tonnage. The die temperature is 390° C., and the blank temperature after initial forging is 420° C. In the final forging process, the hub spokes and windows are all formed, and the wheel rim is initially formed.

After the final forging, the robot puts the forging blank into the trimming and reaming machine, and the trimming and reaming process completes the on-line punching and reaming of the wheel rim, and cuts off the flash at the same time. The slider on the equipment drives the upper die to press down, expands the blank wheel rim according to the specified height, flushes out the central hole, and cuts off the flash; prepare for the subsequent spinning process; the die temperature is room temperature, and the blank temperature after trimming is 380° C.

The forging off-line blank is placed on the spinning die, and then three rollers move according to the processing program. Through hot spinning, the forged short-thick wheel rim is spun into a thin rim, and the product is basically formed. The three-roller vertical spinning machine, the die temperature is room temperature, and the blank temperature is 380° C.

After spinning, the forged wheel blank is sent into a solid solution furnace for solid solution treatment. The solid solution furnace rises to 450±5° C. within 3±0.5 h, kept warm for 4±0.2 h, and rises to 475±5° C. within 0.5±0.1 h, kept warm for 4±0.2 h; then in the quenching treatment, quenching water temperature 62° C., transfer time less than 15 s, and swing up and down more than 30 times, after quenching stay in water for more than 30 min, temperature rise cannot exceed 65° C.; it is transferred to an ageing furnace for aging treatment within 4 hours after quenching treatment. The aging furnace rises to 80±3° C. within 1±0.2 h, kept warm for 8±1h, and rises to 120±3° C. within 1±0.2 h, kept warm for 18±1h. After ageing treatment, it is discharged from the furnace for air cooling.

TABLE 5

| 7034 Alloy Composition and Weight Percentage | | | | | | | | | | |
|---|---|---|---|---|---|---|---|---|---|---|
| No. | Si | Fe | Cu | Mn | Mg | Cr | Zn | Ti | Zr | Al |
| 5 | 0.02 | 0.07 | 1.15 | 0.05 | 2.61 | 0.08 | 11.5 | 0.010 | 0.14 | balance |
| 6 | 0.03 | 0.05 | 0.95 | 0.12 | 2.25 | 0.09 | 11.7 | 0.007 | 0.18 | balance |
| 7 | 0.05 | 0.03 | 1.03 | 0.09 | 2.78 | 0.13 | 11.8 | 0.006 | 0.22 | balance |
| 8 | 0.06 | 0.06 | 0.89 | 0.15 | 2.81 | 0.07 | 11.3 | 0.009 | 0.25 | balance |
| comparative example 2 | 0.04 | 0.04 | 1.01 | 0.10 | 2.64 | 0.09 | 11.6 | 0.008 | 0.20 | balance |

The mechanical properties of 7034 forged wheels are shown in Table 6:

TABLE 6

| Mechanical Properties of 7034 Forged Wheels | | | | | |
|---|---|---|---|---|---|
| No. | Part | Yield strength/MPA | tensile strength/MPA | elongation/% | section shrinkage/% |
| 5 | Wheel center | 585 | 632 | 11.2 | 26.8 |
|   | Spokes | 596 | 643 | 12.1 | 27 |
|   | Outer rim | 588 | 640 | 12.3 | 25.8 |
|   | Inner rim | 598 | 645 | 11.5 | 25.4 |
| 6 | Wheel center | 589 | 653 | 10.8 | 26.7 |
|   | Spokes | 597 | 653 | 10.6 | 25.3 |
|   | Outer rim | 602 | 655 | 11 | 26.8 |
|   | Inner rim | 600 | 658 | 11.1 | 25 |
| 7 | Wheel center | 580 | 647 | 12.1 | 24.8 |
|   | Spokes | 587 | 649 | 12.2 | 24.9 |
|   | Outer rim | 590 | 655 | 11.9 | 25.2 |
|   | Inner rim | 597 | 660 | 11.2 | 25.3 |
| 8 | Wheel center | 589 | 654 | 10.9 | 25.7 |
|   | Spokes | 598 | 661 | 11.5 | 24.5 |
|   | Outer rim | 593 | 658 | 11.7 | 24.9 |
|   | Inner rim | 596 | 658 | 11.6 | 25.1 |
| comparative example 2 | Wheel center | 564 | 632 | 3.1 | 10.3 |
|   | Spokes | 572 | 633 | 4.2 | 9.8 |
|   | Outer rim | 568 | 637 | 5.1 | 9.9 |
|   | Inner rim | 577 | 641 | 4 | 10.1 |

The electrical conductivity, impact performance and fatigue performance of 7034 forged wheels are shown in Table 7:

TABLE 7

Electrical Conductivity, Impact Performance and Fatigue Performance of 7034 Forged Wheels

| No. | Electrical conductivity /% IACS | 13-degree Impact 0° | 13-degree Impact 90° | Bench experiment Bending fatigue/ rotation | Bench experiment Bending fatigue/ rotation |
|---|---|---|---|---|---|
| 5 | 36.6-37.8 | Qualified | Qualified | 510893 | 1503892 |
| 6 | 36.3-38.1 | Qualified | Qualified | 539284 | 1683982 |
| 7 | 36.7-38 | Qualified | Qualified | 498274 | 1601985 |
| 8 | 37-38.4 | Qualified | Qualified | 509424 | 1578278 |
| comparative example 2 | 34.8-36.2 | Unqualified | Unqualified | 278465 | 637628 |

The maximum depth and average depth of intergranular corrosion of 7034 forged wheels are shown in Table 8:

TABLE 8

Corrosion Resistance of 7034 Forged Wheels

Maximum depth of intergranular corrosion/μm

| No. | 1 | 2 | 3 | 4 | 5 | Average |
|---|---|---|---|---|---|---|
| 5 | 65 | 78 | 81 | 77 | 69 | 74 |
| 6 | 89 | 81 | 56 | 101 | 93 | 84 |
| 7 | 89 | 110 | 102 | 65 | 77 | 89 |
| 8 | 99 | 111 | 89 | 103 | 121 | 105 |
| comparative example 2 | 231 | 255 | 268 | 289 | 256 | 260 |

Embodiment 3

In this embodiment, 7075 aluminum alloy in 7000 series aluminum alloy taken as an example to specifically explain the technical solution is batched according to the chemical composition and mass percentage of 7075 alloy shown in Table 9, melted in a smelting furnace, treated by on-line degassing and slag removal after secondary refining, and transferred to a leaky bag to obtain 7075 aluminum alloy ingot by spray forming process after standing for a certain time, and the density of ingot is over 99%. Comparative example 3 is the production of 7075 aluminum alloy ingot by traditional direct chill casting method.

The extrusion bar with diameter of 254 mm is obtained by extruding 7075 aluminum alloy ingot. The extrusion bar temperature is 440° C., the extrusion die temperature is 450° C., the extrusion speed is 0.4 mm/min, and the extrusion ratio is 12.

The extruded bar is sawed into a 221 mm blank, and the blank is heated to the set temperature of 440° C. in a heating furnace for 400min to ensure the uniform temperature of the blank.

The blank is put into the rotary forging press by robot, and the die temperature is 430° C. The lubricating hand robot sprays graphite lubricant automatically, the slider on the equipment drives the upper die to rotate and press down according to the program control, and rolls the bar with a 5-degree processing angle in a rotating way to roll the bar into a cake.

The robot takes out the rotary forging cake from the rotary forging and puts it into the initial forging press, the lubricating hand robot automatically sprays graphite lubricant, the upper slider of the initial forging press drives the upper die to press down, and fills the upper and lower die cavities with the blank according to the specified tonnage. The working temperature of the die is 420° C., and the blank temperature after rotary forging is 440° C. In the process of initial forging, the spokes, windows and wheel rims of the wheel hub are initially formed.

The robot takes out the initial forging blank from the initial forging machine and puts it into the final forging press. The lubricating hand robot automatically sprays graphite lubricant. The upper slider of the final forging press drives the upper die to press down, and fills the upper and lower die cavities with the blank according to the designated tonnage. The die temperature is about 420° C., and the blank temperature after initial forging is 440° C. In the final forging process, the hub spokes and windows are all formed, and the wheel rim is initially formed.

After the final forging, the robot puts the forging blank into the trimming and reaming machine, and the trimming and reaming process completes the on-line punching and reaming of the wheel rim, and cuts off the flash at the same time. The slider on the equipment drives the upper die to press down, expands the blank wheel rim according to the specified height, flushes out the central hole, and cuts off the flash; prepare for the subsequent spinning process; the die temperature is room temperature, and the blank temperature after trimming is 400° C.

The forging off-line blank is placed on the spinning die, and then three rollers move according to the processing program. Through hot spinning, the forged short-thick wheel rim is spun into a thin rim, and the product is basically formed. The three-roller vertical spinning machine, the die temperature is room temperature, and the blank temperature is 420° C.

After spinning, the forged wheel blank is sent into a solid solution furnace for solid solution treatment. The solid solution furnace rises to 460±5° C. within 3±0.5 h, kept warm for 4±0.2 h, rises to 475±5° C. within 0.5±0.1 h, and kept warm for 4±0.2 h; then quenching treatment, the quenching water temperature is 60° C., the transfer time is less than 15s, and it swings up and down for more than 30 times. After quenching, it stays in water for more than 30 min, and the temperature rise cannot exceed 65° C.; it is transferred to an aging furnace for aging treatment within 4 hours after quenching treatment. The aging furnace rises to 135±3° C. within 1±0.2 h, kept warm for 6±1 h, and rises to 168±3° C. within 1±0.2 h, kept warm for 18±1 h. After aging treatment, it is discharged from the furnace for air cooling.

TABLE 9

7075 Alloy Composition and Mass Percentage

| No. | Si | Fe | Cu | Mn | Mg | Cr | Zn | Ti | Al |
|---|---|---|---|---|---|---|---|---|---|
| 9 | 0.05 | 0.36 | 1.40 | 0.04 | 2.80 | 0.20 | 5.3 | 0.02 | balance |
| 10 | 0.11 | 0.28 | 1.65 | 0.15 | 2.51 | 0.23 | 5.4 | 0.04 | balance |

TABLE 9-continued

| | 7075 Alloy Composition and Mass Percentage | | | | | | | | |
|---|---|---|---|---|---|---|---|---|---|
| No. | Si | Fe | Cu | Mn | Mg | Cr | Zn | Ti | Al |
| 11 | 0.09 | 0.33 | 1.77 | 0.18 | 2.67 | 0.25 | 5.6 | 0.05 | balance |
| 12 | 0.13 | 0.22 | 1.83 | 0.09 | 2.35 | 0.26 | 5.8 | 0.03 | balance |
| comparative example 3 | 0.10 | 0.29 | 1.66 | 0.12 | 2.58 | 0.24 | 5.5 | 0.03 | balance |

The mechanical properties of 7075 forged wheels are shown in Table 10:

TABLE 10

Mechanical Properties of 7075 Forged Wheels

| No. | Part | Yield strength/MPa | Tensile Strength/MPa | Elongation/% | Section Shrinkage/% |
|---|---|---|---|---|---|
| 9 | Wheel center | 507 | 553 | 13.8 | 35.7 |
|  | Spokes | 512 | 560 | 13.9 | 36.2 |
|  | Outer rim | 510 | 557 | 13.7 | 35.3 |
|  | Inner rim | 518 | 575 | 12.6 | 34.6 |
| 10 | Wheel center | 506 | 560 | 13.1 | 33.4 |
|  | Spokes | 511 | 562 | 13.4 | 33.8 |
|  | Outer rim | 514 | 566 | 13.9 | 32.8 |
|  | Inner rim | 523 | 565 | 12.9 | 34.7 |
| 11 | Wheel center | 501 | 551 | 13.3 | 34.1 |
|  | Spokes | 505 | 565 | 13.9 | 33.8 |
|  | Outer rim | 518 | 561 | 13.1 | 33.1 |
|  | Inner rim | 513 | 568 | 12.8 | 32.8 |
| 12 | Wheel center | 505 | 554 | 12 | 32.7 |
|  | Spokes | 512 | 566 | 13 | 33.4 |
|  | Outer rim | 511 | 563 | 13.2 | 34.9 |
|  | Inner rim | 519 | 567 | 12.7 | 33.1 |
| comparative example 3 | Wheel center | 491 | 542 | 6.9 | 22.1 |
|  | Spokes | 496 | 545 | 7.8 | 21.6 |
|  | Outer rim | 502 | 553 | 8.9 | 21 |
|  | Inner rim | 506 | 562 | 7.7 | 19 |

The electrical conductivity, impact performance and fatigue performance of 7075 forged wheels are shown in Table 11:

TABLE 11

Electrical Conductivity, Impact Performance and Fatigue Performance of 7075 Forged Wheels

| | | | | Bench experiment | |
|---|---|---|---|---|---|
| | Electrical conductivity | 13°Impact | | Bending fatigue/ | Bending fatigue/ |
| No. | /% IACS | 0° | 90° | rotation | rotation |
| 9 | 38.7-40.2 | Qualified | Qualified | 789321 | 2310485 |
| 10 | 38.5-40.5 | Qualified | Qualified | 873932 | 2502984 |
| 11 | 38.8-40.8 | Qualified | Qualified | 768846 | 1984752 |
| 12 | 38.6-40.6 | Qualified | Qualified | 901947 | 2091847 |
| comparative example 3 | 37.5-38.2 | Unqualified | Unqualified | 458872 | 1029485 |

The maximum depth and average depth of intergranular corrosion of 7075 forged wheels are shown in Table 12:

TABLE 12

Corrosion Resistance of 7075 Forged Wheels

| | Maximum depth of intergranular corrosion/μm | | | | | |
|---|---|---|---|---|---|---|
| No. | 1 | 2 | 3 | 4 | 5 | Average |
| 9 | 32 | 41 | 24 | 44 | 37 | 36 |
| 10 | 54 | 21 | 33 | 40 | 29 | 35 |
| 11 | 16 | 23 | 54 | 42 | 38 | 35 |
| 12 | 23 | 31 | 43 | 33 | 18 | 30 |
| comparative example 3 | 132 | 149 | 181 | 173 | 141 | 155 |

Compared with the ingot by adopting traditional direct chill casting under the same forging process, the method for producing special vehicle wheels by applying 7000 series aluminum alloy of the present disclosure has the following advantages:

The wheel manufactured by the method for manufacturing special vehicle wheels by using 7000 series aluminum alloys of the present disclosure has a strength of more than 500 MPa and an elongation of more than 10%, and has high strength and good toughness.

The wheel manufactured by the method for manufacturing special vehicle wheels by using 7000 series aluminum alloys of the present disclosure has higher and more stable electrical conductivity, is qualified in impact tests, and has good bending and radial fatigue properties.

The wheel manufactured by the method for manufacturing special vehicle wheels by using 7000 series aluminum alloys of the present disclosure has low intergranular corrosion sensitivity and good corrosion resistance.

The above are only preferred embodiments of the present disclosure and are not intended to limit the present disclosure. Any modifications, equivalents, modifications, etc. made within the spirit and principles of the present disclosure should be included in the scope of protection of the present disclosure.

What is claimed is:

1. A method for manufacturing special purpose vehicle wheels using 7000 series aluminum alloys, wherein the method comprises the following steps:
   Step 1, smelting 7000 series aluminum alloys in a smelting furnace to obtain a solution;
   Step 2, making the solution obtained in step 1 into an aluminum alloy ingot blank through a spray forming process;
   Step 3, extruding the aluminum alloy ingot blank of step 2 to obtain an extrusion bar;
   Step 4, sawing the extrusion bar into blanks and heating them;
   Step 5, putting the blank into a rotary forging press and rotary forging the blank into a cake;
   Step 6, putting the cake into a press for forging and forming;
   Step 7, performing spinning and forming on a wheel rim initially formed in step 6; and
   Step 8, performing solid solution, quenching process and ageing treatment sequentially on the wheel rim,
   wherein during the quenching process, the wheel rim is swung up and down for more than 30 times,
   wherein step 6 comprises an initial forging process and a final forging process, the initial forging process is carried out in an initial forging press, and the spokes, wheel rims and windows are initially formed, and
   the final forging process is carried out in a final forging press, and the spokes and windows are completely formed,
   wherein a trimming and reaming process is further included between step 6 and step 7.

2. The method for manufacturing special purpose vehicle wheels by using 7000 series aluminum alloys according to claim 1, wherein
   in the quenching process, the quenching water temperature is 60-63° C., the transfer time is less than 15s,
   after quenching and before ageing treatment, the wheel rim stays in water for more than 30 min.

* * * * *